(12) United States Patent
Souhrada et al.

(10) Patent No.: US 11,005,810 B2
(45) Date of Patent: May 11, 2021

(54) MULTI-TENANT ENVIRONMENT WITH OVERLAPPING ADDRESS SPACE

(71) Applicant: INTERNATIONAL BUSINESS MACHINES CORPORATION, Armonk, NY (US)

(72) Inventors: William C. Souhrada, Southhampton, NY (US); Fernando Matos, Hellertown, PA (US); Marianne Aubry, Saint-Paul de Vence (FR); B. Stephen Currie, Harleysville, PA (US); Aram Avetisyan, Brno (CZ)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 44 days.

(21) Appl. No.: 16/578,891

(22) Filed: Sep. 23, 2019

(65) Prior Publication Data
US 2021/0067486 A1    Mar. 4, 2021

Related U.S. Application Data

(60) Provisional application No. 62/893,358, filed on Aug. 29, 2019.

(51) Int. Cl.
*H04L 29/12* (2006.01)
*H04L 12/46* (2006.01)

(52) U.S. Cl.
CPC ...... *H04L 61/2514* (2013.01); *H04L 12/4641* (2013.01); *H04L 61/1547* (2013.01); *H04L 61/2557* (2013.01); *H04L 61/6013* (2013.01)

(58) Field of Classification Search
None
See application file for complete search history.

(56) References Cited

U.S. PATENT DOCUMENTS 9,098,320 B2    8/2015    Yung
9,659,251 B2    5/2017    Tang et al.
(Continued)

FOREIGN PATENT DOCUMENTS

WO    2014186957    11/2014
WO    201527513    3/2015

OTHER PUBLICATIONS

Mell et al., "The NIST Definition of Cloud Computing", NIST, Special Publication 800-145, Sep. 2011, 7 pages.

*Primary Examiner* — Brian Whipple
(74) *Attorney, Agent, or Firm* — William Hartwell; Andrew D. Wright; Roberts Calderon Safran & Cole, P.C.

(57) ABSTRACT

A method includes: receiving communications from first and second tenants of a multi-tenant computing environment over first and second dedicated networks, respectively, the communications being transmitted to a first globally unique IP address in first and second dedicated environments, respectively; NATing the first globally unique IP address, to which the communication from the first tenant was transmitted, to a first non-globally unique IP address that is locally unique in the service provider environment; NATing the first globally unique IP address, to which the communication from the second tenant was transmitted, to a second non-globally unique IP address that is locally unique in the service provider environment; providing the communication from the first tenant and the communication from the second tenant access to a shared resource in the service provider environment using the first and second non-globally unique IP addresses, respectively.

20 Claims, 7 Drawing Sheets

(56) References Cited

U.S. PATENT DOCUMENTS

| | | |
|---|---|---|
| 9,712,440 B2 | 7/2017 | Koodli et al. |
| 2014/0207861 A1 | 7/2014 | Brandwine et al. |
| 2015/0188802 A1 | 7/2015 | Yoon et al. |
| 2018/0227242 A1 | 8/2018 | Mordani et al. |

MULTI-TENANT ENVIRONMENT WITH OVERLAPPING ADDRESS SPACE

BACKGROUND

The present invention relates generally to service provider management platforms and, more particularly, to a multi-tenant environment optimizing the placement of applications, in a secure manner, in a service provider environment connected to tenant premises with overlapping addresses.

Multi-tenant environments provided by service providers can have environments that include dedicated resources and environments that have shared resources. Some tenants access resources in both the shared resource environment and their dedicated resource environment.

SUMMARY

In a first aspect of the invention, there is a computer-implemented method including: receiving, by a computer device, a communication from a first tenant of a multi-tenant computing environment over a first dedicated communication network, the communication being transmitted to a first globally unique internet protocol (IP) address in a first dedicated environment in a service provider environment, the first dedicated environment being dedicated to the first tenant; receiving, by the computer device, a communication from a second tenant of the multi-tenant computing environment over a second dedicated communication network, the communication from the second tenant being transmitted to the first globally unique IP address in a second dedicated environment in the service provider environment, the second dedicated environment being dedicated to the second tenant; network address translating, by the computer device, the first globally unique IP address, to which the communication from the first tenant was transmitted, to a first non-globally unique IP address that is locally unique in the service provider environment; network address translating, by the computer device, the first globally unique IP address, to which the communication from the second tenant was transmitted, to a second non-globally unique IP address that is locally unique in the service provider environment; providing, by the computer device, the communication from the first tenant access to a shared resource in the service provider environment using the first non-globally unique IP address; and providing, by the computer device, the communication from the second tenant access to the shared resource using the second non-globally unique IP address.

In another aspect of the invention, there is a computer program product including a computer readable storage medium having program instructions embodied therewith. The program instructions are executable by a computing device to cause the computing device to: receive a communication from a first tenant of a multi-tenant computing environment over a first dedicated communication network, the communication being transmitted to a first globally unique internet protocol (IP) address in a first dedicated environment in a service provider environment, the first dedicated environment being dedicated to the first tenant; receive a communication from a second tenant of the multi-tenant computing environment over a second dedicated communication network, the communication from the second tenant being transmitted to the first globally unique IP address in a second dedicated environment in the service provider environment, the second dedicated environment being dedicated to the second tenant; network address translate the first globally unique IP address, to which the communication from the first tenant was transmitted, to a first non-globally unique IP address that is locally unique in the service provider environment; network address translate the first globally unique IP address, to which the communication from the second tenant was transmitted, to a second non-globally unique IP address that is locally unique in the service provider environment; provide the communication from the first tenant access to a shared resource in the service provider environment using the first non-globally unique IP address; and provide the communication from the second tenant access to the shared resource using the second non-globally unique IP address.

In another aspect of the invention, there is system including a processor, a computer readable memory, and a computer readable storage medium. The system includes: program instructions to receive a communication from a first tenant of a multi-tenant computing environment over a first dedicated communication network, the communication being transmitted to a first globally unique internet protocol (IP) address in a first dedicated environment in a service provider environment, the first dedicated environment being dedicated to the first tenant; program instructions to receive a communication from a second tenant of the multi-tenant computing environment over a second dedicated communication network, the communication from the second tenant being transmitted to the first globally unique IP address in a second dedicated environment in the service provider environment, the second dedicated environment being dedicated to the second tenant; program instructions to network address translate the first globally unique IP address, to which the communication from the first tenant was transmitted, to a first non-globally unique IP address that is locally unique in the service provider environment; program instructions to network address translate the first globally unique IP address, to which the communication from the second tenant was transmitted, to a second non-globally unique IP address that is locally unique in the service provider environment; program instructions to provide the communication from the first tenant access to a shared resource in the service provider environment using the first non-globally unique IP address; and program instructions to provide the communication from the second tenant access to the shared resource using the second non-globally unique IP address. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to service provider management platforms and, more particularly, to a multi-tenant environment optimizing the placement of applications, in a secure manner, in a service provider environment connected to tenant premises with overlapping addresses. Embodiments of the invention provide a method for minimizing the number of public internet protocol (IP) addresses in a multi-tenant environment with shared resources. Embodiments provide two-way communication between the tenants and the multi-tenant environment without requiring tenants to change (translate) their IP addresses. In embodiments, the method includes: for each tenant in the multi-tenant environment, providing a separate dedicated communication network for the tenant to connect to the environment, providing addresses for dedicated tenant resources using Carrier Grade Network Address Translation (CGN), and providing IP addresses for shared resources using public, non-routable addressing; and in response to a communication between a tenant and a shared resource, performing a Network Address Translation (NAT) of a CGN address of the tenant to a public, non-routable address for the shared resource.

Embodiments of the invention provide a secure communication network between multiple customers and a service provider. In embodiments, each customer has its own dedicated communication network (for example, a virtual private network (VPN)) through which that customer communicates with the service provider. In embodiments, each customer uses their own internet protocol (IP) addresses to communicate (through their dedicated communication network) with an environment in the service provider's infrastructure that is dedicated to that customer. In embodiments, a single range of IP addresses (unique to the service provider and non-public) is used by the service provider such that every customer contacts the same IP address to access a particular service in the service provider environment. Even in the case of two customers having IP addresses that overlap (have the same designator), a computer device of the service provider infrastructure distinguishes between the two customers by their dedicated communication networks and/or their dedicated environments in the service provider's infrastructure. A computer device of the service provider infrastructure translates the user's IP addresses to globally unique IP addresses for use by shared resources in the service provider's infrastructure. In this manner, communications from a particular customer are identifiable as being from that customer even though the customer's IP address is not unique. In embodiments, the customer does not need to perform any translation to communicate securely with the service provider infrastructure because the computer device of the service provider infrastructure performs the needed translation.

In embodiments of the invention, each tenant locally uses Request for Comment 6598 (RFC6598) IP Addresses that are not globally unique, but are locally unique to each tenant in the system. Network address translation (NAT) occurs on the VPN device, to the same or different, Internet Assigned Numbers Authority (IANA) registered, globally unique, but not advertised on the public internet, IP address. Tenant premises-initiated communications are to the IANA registered ranges. Because those are globally unique, they will not conflict with the customer's own networks. Because each tenant is isolated from one another inside of the system, it does not matter if the same IANA range is reused for each tenant. Each tenant believes it is talking to a globally unique IP address.

In embodiments, in response to a communication from a shared resource in the service provider infrastructure to a first tenant, a first proxy translates a first locally unique (but non-globally unique) IP address to a globally unique IP address. The first proxy resides in a dedicated environment in the service provider infrastructure that is dedicated to the first tenant, and the first tenant communicates with the globally unique IP address. In response to a communication from the shared resource in the service provider infrastructure to a second tenant, a second proxy translates a second locally unique (but non-globally unique) IP address to the globally unique IP address. The second proxy resides in a dedicated environment in the service provider infrastructure that is dedicated to the second tenant, and the second tenant communicates with the globally unique IP address.

Implementations of the invention include features that improve the functioning of a computer and enable scalability. For example, embodiments of the invention minimize the number of public IP addresses needed in a multi-tenant environment with shared resources by providing globally unique IP addresses for the shared resources in the environment, while allowing tenants to use their own IP addresses for both shared and dedicated resources. In addition, implementations of the invention include features that are other than what is well-understood, routine, conventional activity in the field. For example, a tenant accessing resources in a multi-tenant environment using globally unique IP addresses for accessing the resources, while using only its own, unmodified or translated, IP addresses is not well-understood, routine, conventional activity.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
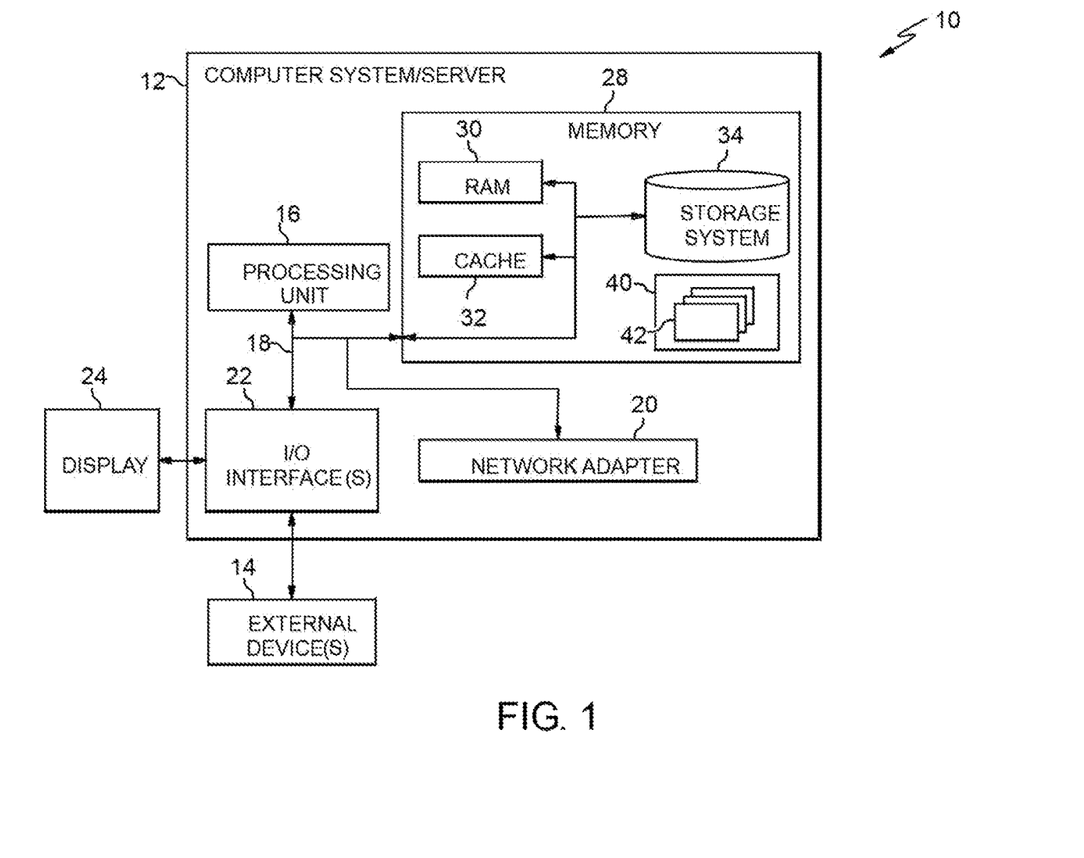
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
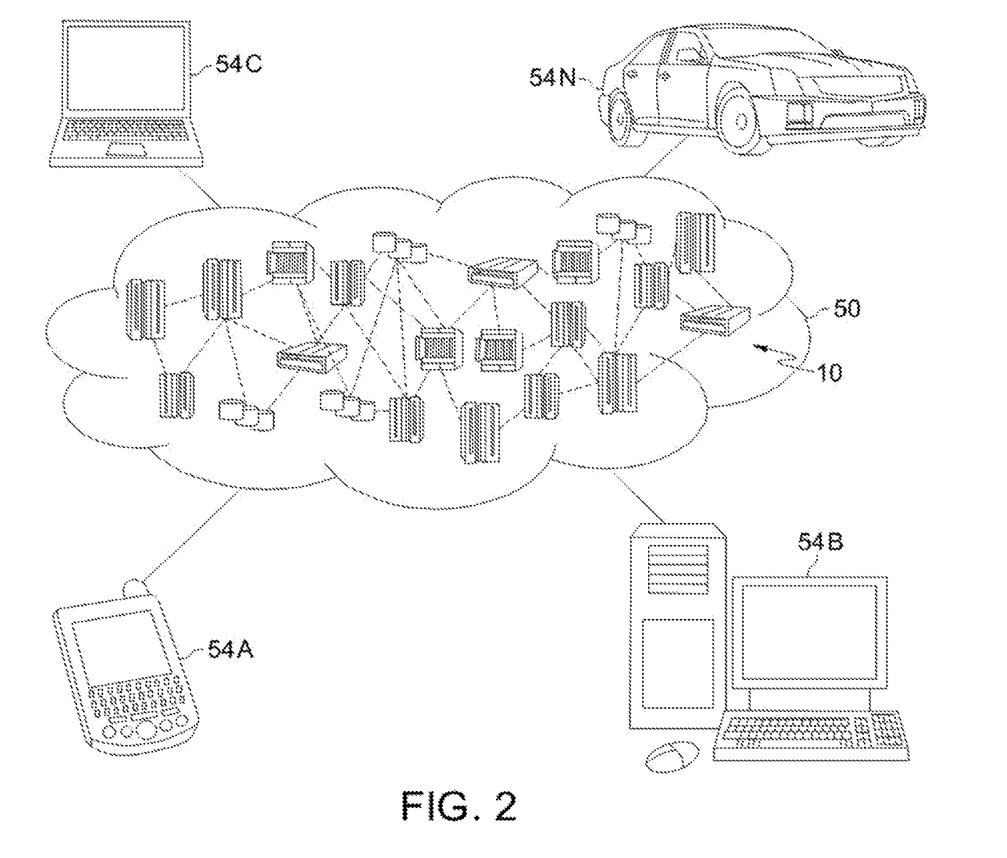
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
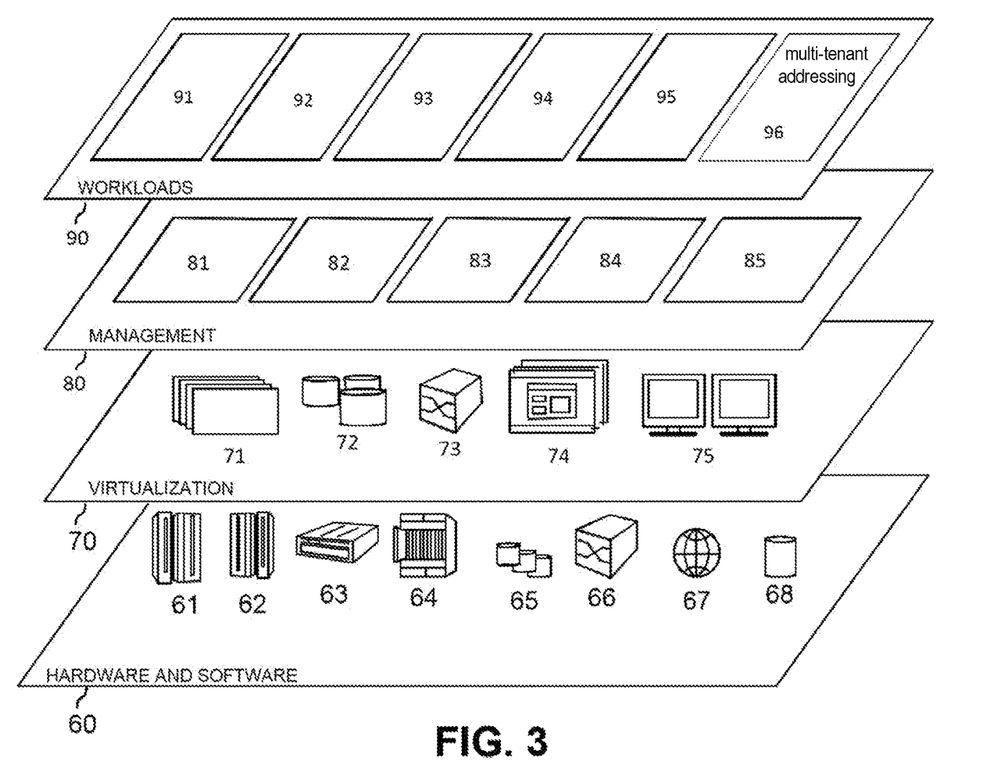
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and multi-tenant addressing 96.

Implementations of the invention may include a computer system/server 12 of FIG. 1 in which one or more of the program modules 42 are configured to perform (or cause the computer system/server 12 to perform) one of more functions of the multi-tenant addressing 96 of FIG. 3. For example, the one or more of the program modules 42 may be configured to: receive a communication from a first tenant of a multi-tenant computing environment over a first dedicated communication network, the communication being transmitted to a first globally unique internet protocol (IP) address in a first dedicated environment in a service provider environment, the first dedicated environment being dedicated to the first tenant; receive a communication from a second tenant of the multi-tenant computing environment over a second dedicated communication network, the communication from the second tenant being transmitted to the first globally unique IP address in a second dedicated environment in the service provider environment, the second dedicated environment being dedicated to the second tenant; network address translate the first globally unique IP address, to which the communication from the first tenant was transmitted, to a first non-globally unique IP address that is locally unique in the service provider environment; network address translate the first globally unique IP address, to which the communication from the second tenant was transmitted, to a second non-globally unique IP address that is locally unique in the service provider environment; provide the communication from the first tenant access to a shared resource in the service provider environment using the first non-globally unique IP address; and provide the communication from the second tenant access to the shared resource using the second non-globally unique IP address.

To the extent implementations of the invention collect, store, or employ personal information provided by, or obtained from, individuals (for example, names, addresses, etc.), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Service providers of computing services are preferably able to communicate with multiple tenants from shared resources (devices/servers) while maintaining tight security and assuring communication with each tenant is isolated from communication with other tenants. Service providers preferably have a dedicated environment for multiple customers with overlapping addresses from the same environment. In some systems, dedicated customer environments are in the same cloud account in order to leverage shared resources (e.g., shared servers, backups, Domain Name System (DNS), etc.) and to minimize costs. A service provider can have management servers that communicate with endpoints in each customer premise. There can be shared resources in the provider network that communicate with multiple customers. In some systems, the cloud network on which the management platform resides uses Request for Comment 1918 (RFC1918) addressing (or some other addressing standard), and each customer potentially also uses their own RFC1918 addressing (or some other addressing standard). RFC 1918 addressing is for private networks and, as a result, RFC 1918 IP addresses are not globally unique. As a result, IP addressing conflicts can exists. The use of network address translation (NAT) to solve addressing conflicts can be complex and require additional computing resources. Solutions to these problems are preferably able to support many tenants.

Embodiments of the invention provide a solution to the above problems. In embodiments, virtualizing a network inside the environment allows the use of BYOIP (bring your own IP) address space, and provides a secure environment for every customer dedicated segment. In embodiments, the use of Carrier Grade NAT (CGN) address space for the IP addresses in the multi-tenant environment (Request for Comment 6598 (RFC 6598)) avoids conflicts with the customer address space. In embodiments, CGN IP addresses are only used by the service provider and are not advertised outside of the service provider's domain. Therefore, the CGN IP addresses should not conflict with addresses in the customers' networks. CGN IP addresses are not globally unique, but are locally unique within the service provider environment and, therefore, avoid addressing conflicts. Also, CGN IP addresses provide a single IP address that all tenants use for a particular resource in the multi-tenant environment. Embodiments ensure that the system distinguishes one tenant from another (or one tenant endpoint from another) by communicating with each tenant over a different dedicated communication network (for example, a VPN).

Figure 4:
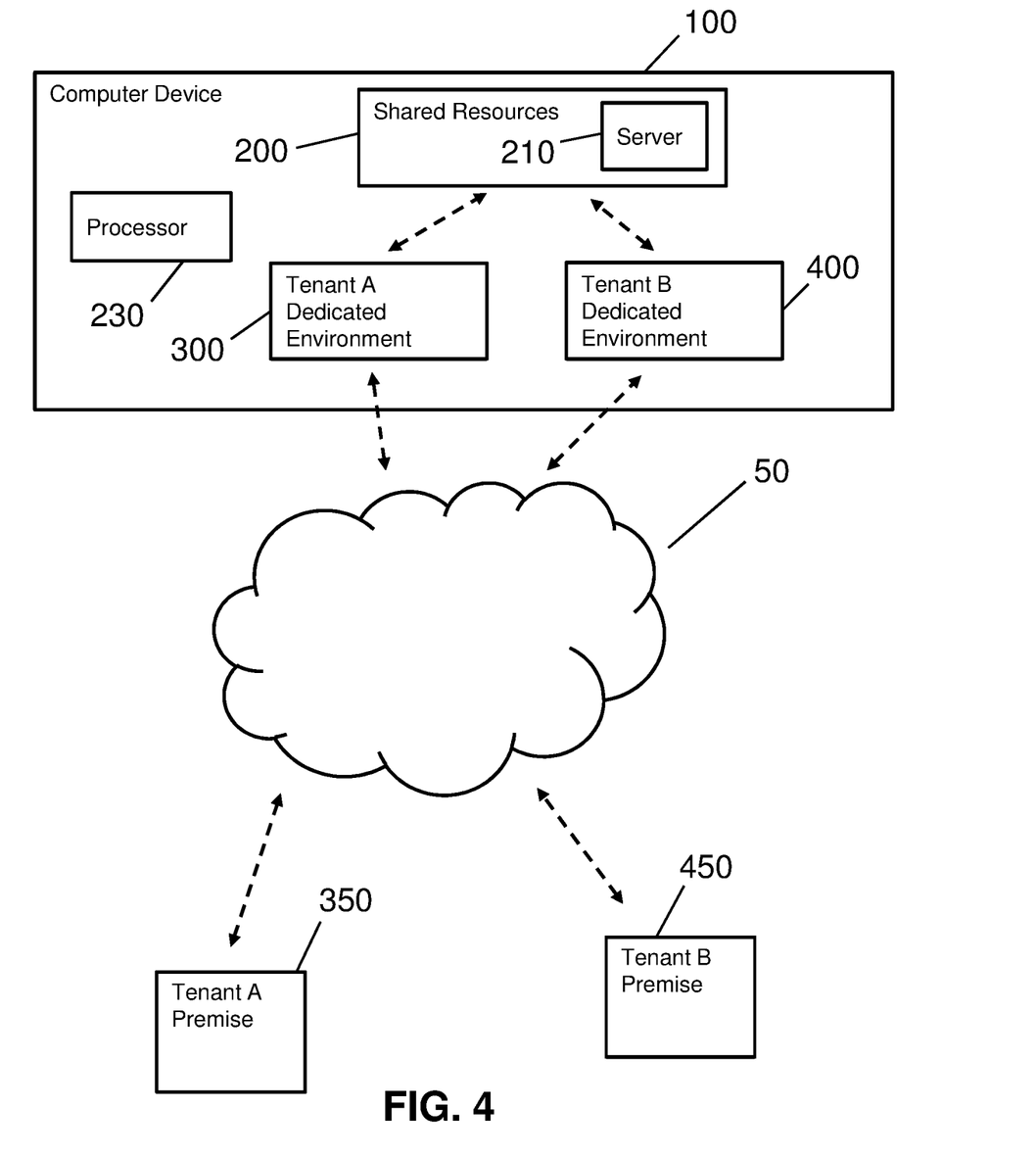
FIG. 4 shows a block diagram of an exemplary environment in accordance with aspects of the invention.

FIG. 4 shows a block diagram of an exemplary environment in accordance with aspects of the invention. In embodiments, the environment includes a computer device 100 such as, for example, computer system/server 12 in FIG. 1. Computer device 100 has shared resources 200, for example, one or more of program modules 42 in FIG. 1, a tenant A dedicated environment 300, for example, one or more of program modules 42 in FIG. 1, and a tenant B dedicated environment 400 such as, for example, one or more of program modules 42 in FIG. 1. In this embodiment, computer device 100 includes a processor 230 that performs computing operations in computer device 100. Although one processor 230 is shown in FIG. 4, it is noted that embodiments include more than one processor 230. Tenant A dedicated environment 300 is a computing environment in service provider environment 100 that is accessible by only a tenant A and where resources dedicated to tenant A (dedicated resources) reside. Tenant B dedicated environment 400 is a computing environment in service provider environment 100 that is accessible by only a tenant B and where resources dedicated to tenant B (dedicated resources) reside. Shared resources 200 is an area in computer device 100 that includes, in this example, a server 210 that contains one or more shared resources that are accessible by one or both of tenants A and B. Computer device 100 serves as a service provider environment as, for example, described in more detail with reference to FIG. 5, below.

Computer device 100 communicates with one or more tenant premises such as, in this example, tenant A premise 350 and tenant B premise 450, through, in this example, cloud computing environment 50. In other examples, computer device 100 communicates with one or both of tenant premises 350, 450 through networks other than cloud computing environment 50 such as, for example, a non-cloud wireless network or a wired network. Examples of tenant premises 350, 450 include a location where the tenant (customer) resources reside. In embodiments, a tenant premise resides at the headquarters, for example, of the customer.

Figure 5:
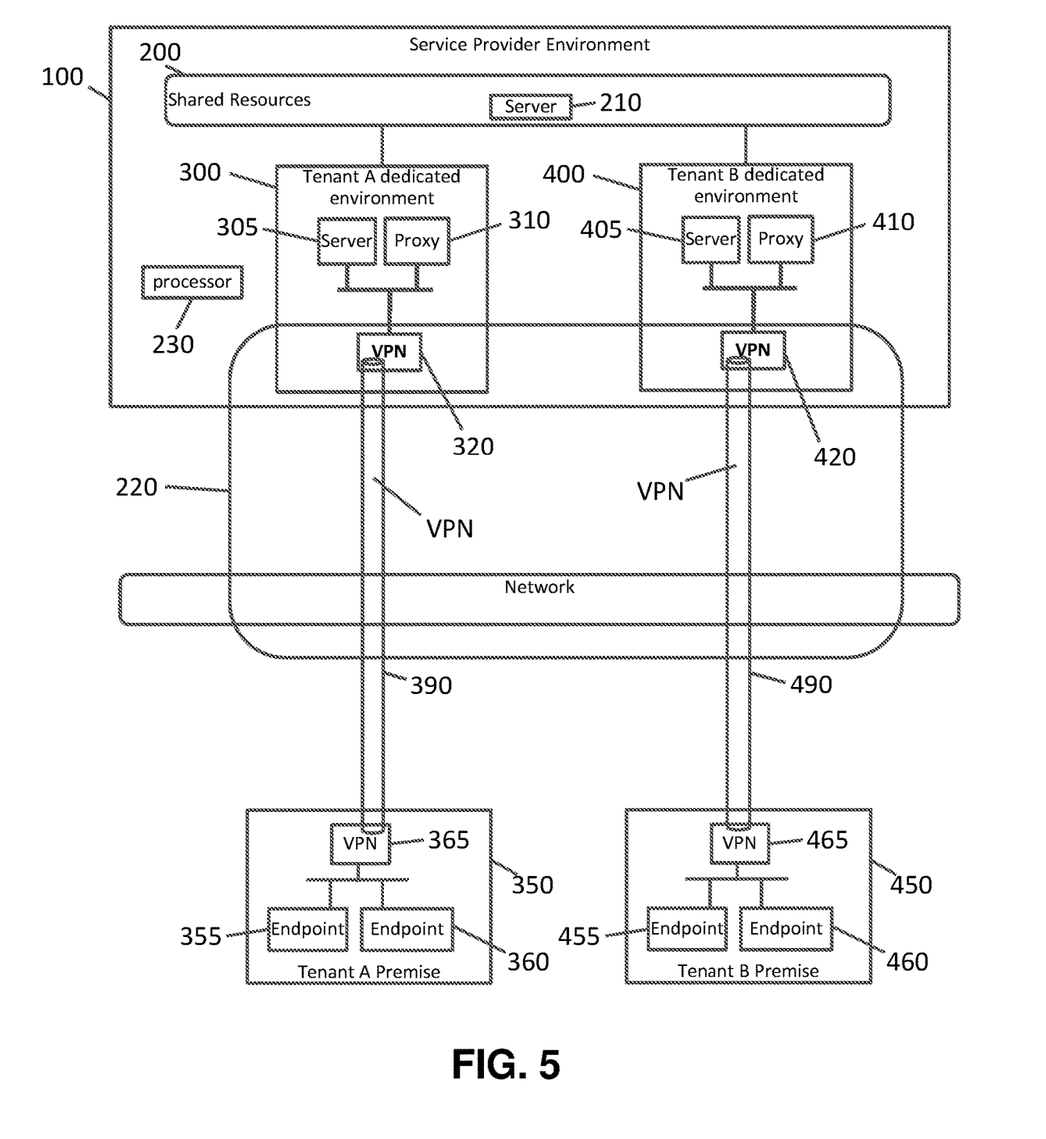
FIG. 5 shows a diagram of an exemplary environment in accordance with aspects of the invention.

FIG. 5 shows an example of an embodiment of the invention in which service provider environment (computing device) 100 interacts with tenant A premise 350 and tenant B premise 450 over a network such as, for example, the Internet, a private network network path, or some other network. Embodiments include a dedicated communication network (for example, a site to site VPN tunnel) between each tenant dedicated environment (300, 400) and that tenant's respective premise (350, 450) to securely connect the tenant dedicated environment and the tenant premise.

In this example, service provider environment 100 connects to tenant A premise 350 over a virtual private network (VPN) 390 across a shared network medium (for example the Internet) to provide secure isolated communication between service provider environment 100 and tenant A. VPN connection point 320 connects tenant A dedicated environment 300 to VPN 390 and performs communication translations between tenant A dedicated environment 300 and tenant A endpoints 355, 360. VPN connection point 365 connects VPN 390 to tenant A endpoints 355, 360. Similarly, service provider environment 100 connects to tenant B premise 450 over a virtual private network (VPN) 490 across a shared network medium (for example, the Internet) to provides secure isolated communication between service provider environment 100 and tenant B. VPN connection point 420 connects tenant B dedicated environment 400 to VPN 490 and performs communication translations between tenant B dedicated environment 400 and tenant B endpoints 455, 460. VPN connection point 465 connects VPN 490 to tenant B endpoints 455, 460.

Endpoints 355, 360, 455, 460 include, for example, computers, terminals, smart phones, tablets, and other devices through which a tenant accesses service provider environment 100 through the tenant's premise 350, 450. While two tenants are shown in FIG. 5, it is noted that in other embodiments, more than two tenant premises connect to service provider environment 100. In embodiments, each tenant uses a different VPN to connect to service provider environment 100. As explained below, because each tenant is using its own dedicated communication network (for example, VPN 390), each tenant premise can use its own IP addresses (for example, RFC 1918 addresses) to communicate with service provider environment 100 and avoid IP address conflicts. This is the case even if two tenant premises are using the same IP address designator because service provider environment 100 differentiates the tenants by their respective dedicated communication networks (for example, VPNs).

In embodiments, service provider environment 100 (which is, in embodiments, a service provider management platform) includes shared resources (those accessed by multiple tenants), and dedicated resources (those dedicated to, and therefore accessed by, only one tenant). In the example of FIG. 5, shared resources 200 reside in service provider environment 100 and service endpoints 355, 360 in tenant A premise 350, and endpoints 455, 460 in tenant B premise 450. In embodiments, shared resources 200 are addressed using CGN IP addresses so that all tenant premises can communicate with shared resources 200 without the tenants performing any IP address translation. Although the tenant does not preform any IP address translation, shared resources 200 communicate to a proxy device (such as proxy 310 described below) with the shared resources' natural addresses and then the proxy device communicates with the resource in the tenant environment.

Service provider environment 100 includes, in this example, a tenant A dedicated environment 300 and a tenant B dedicated environment 400, which are computing environments in service provider environment 100 where resources dedicated to a particular tenant reside. For example, resources that are dedicated to tenant A reside on server 305 in tenant A dedicated environment 300. Similarly, resources that are dedicated to tenant B reside on server 405 in tenant B dedicated environment 400. In embodiments, dedicated resources are also addressed using CGN (globally unique) IP addresses. Resources in tenant A dedicated environment 300 communicate with devices (endpoints 355, 360, for example) in tenant A premise 350 using the real IP address (no translation) of the devices in tenant A premise 350. Similarly, resources in tenant B dedicated environment 400 communicate with devices (endpoints 455, 460, for example) in tenant B premise 450 using the real IP address (no translation) of the devices in tenant B premise 450. In embodiments, resources in tenant A dedicated environment 300 and resources in tenant B dedicated environment 400 also communicate with shared resources 200.

In embodiments, an LANA registered subnet 220 that is not routed on the Internet (public, non-routable) is used to source network address translate (SNAT) the IP addresses in tenant A dedicated environment 300 (which are, for example, CGN IP addresses) when communicating to tenant A premise 350. Similarly, subnet 220 is used to SNAT the IP addresses in tenant B dedicated environment 400 (which are, for example, CGN IP addresses) when communicating to tenant B premise 450. In these embodiments, every tenant will see subnet 220. In embodiments, service provider environment 100 uses the same IANA registered subnet because the communication to each tenant is isolated. The use of subnet 220 minimizes the use of public IP addresses (which are limited in number). Each tenant has a unique segment of subnet 220 that is used by only that tenant.

In embodiments, a proxy (service/server) 310 is a resource that resides in tenant A dedicated environment 300. Proxy 310 acts as an intermediary device between shared resources 200 and endpoints 355, 360 in the tenant A premise 350. In embodiments, proxy 310 has a CGN IP address. Similarly, a proxy (service/server) 410 is a resource that resides in tenant B dedicated environment 400. Proxy 410 acts as an intermediary device between shared resources 200 and endpoints 455, 460 in the tenant B premise 450. In embodiments, proxy 410 has a CGN IP address.

In embodiments, the IP address of a resource (such as, for example, server 305) in tenant A dedicated environment 300 is source network address translated (SNATed) on public subnet 220 established by service provider environment 100. SNATing translates the CGN assigned IP address to an IP address that is usable in the public domain. In embodiments, subnet 220 is an IANA registered range which is not routed across the Internet, and it will not conflict with any address in tenant A premise 350. In embodiments, every customer (tenant) uses the same subnet 220 since the tenant dedicated environments (for example, tenant A dedicated environment 300 and tenant B dedicated environment 400) are isolated from each other. In embodiments, the SNAT referenced above is the only network address translation that occurs in service provider environment 100.

An advantage of embodiments of the invention is scalability, which is provided by: (1) using an IP address space (for example, CGN) that supports a large number of IP addresses; (2) using a large subnet that allows for the support of thousands of tenants; and (3) allowing communication with all devices in the tenant network, regardless of size of the tenant network or the size of the address space. Another advantage of embodiments of the invention is reduced complexity, provided by: (1) allowing communication to resources at the premise with the real endpoint IP addresses (no NAT); (2) allowing tenant premises to have overlapping address space; (3) providing one public, non-routable subnet with which each customer communicates; (4) using NAT in only one instance (the CGN IP address is network address translated (NATed) to a public non-routable subnet); (5) using the same subnet (for example, the subnet ins (3), above) for every customer, allowing a standard pattern for support; (6) not requiring NATing to be done by the customer; and (7) not requiring NATing within the service provider environment. Embodiments of the invention provide multiple tenants access to shared resources while maintaining tenant separation.

Figure 6:
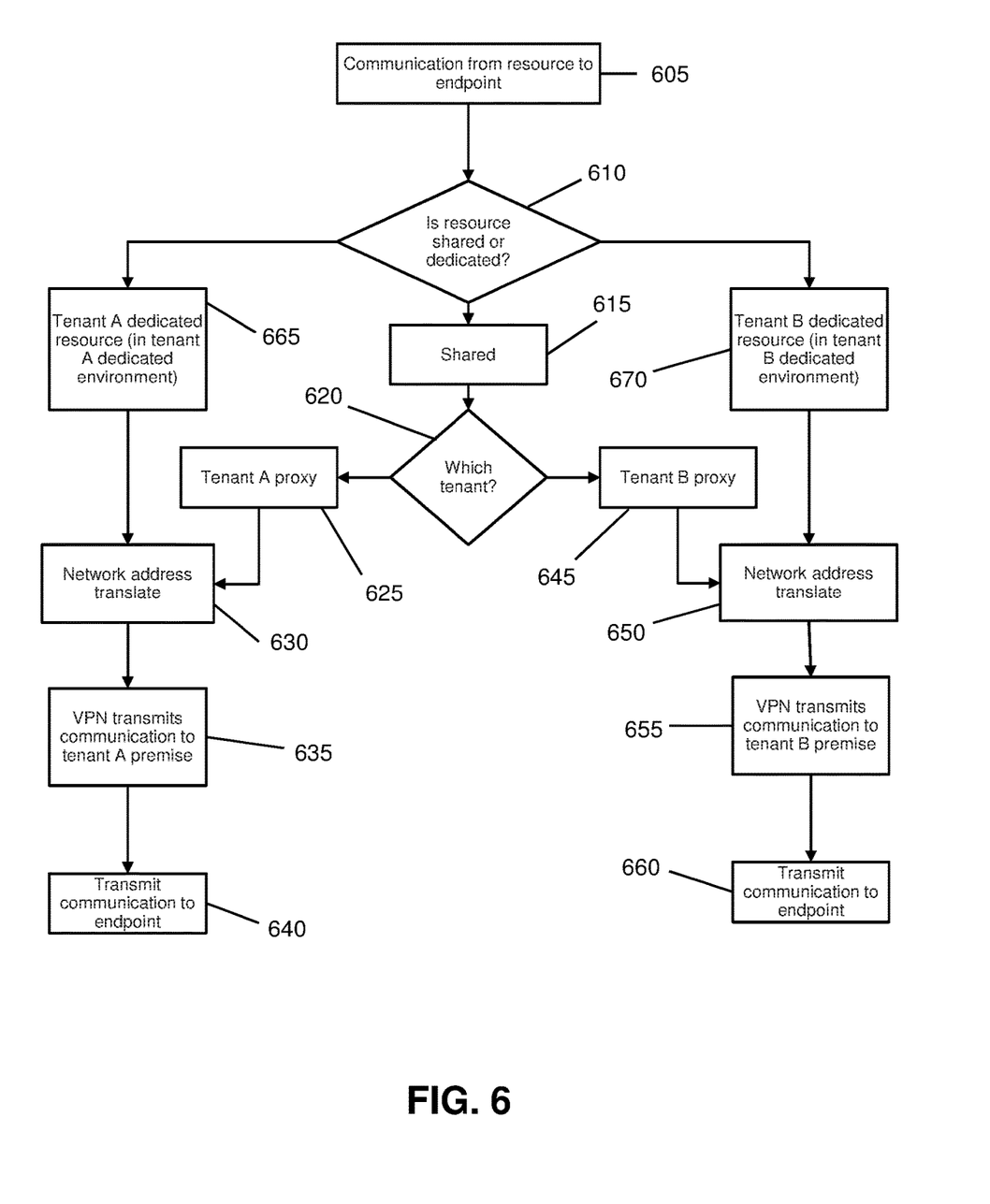
FIG. 6 shows a flowchart of an exemplary method in accordance with aspects of the invention.

FIG. 6 shows a flowchart of an exemplary method in accordance with aspects of the present invention. Steps of the method may be carried out in the environments of FIGS. 4 and 5 and are described with reference to elements depicted in FIGS. 4 and 5.

At step 605, a resource in service provider environment 100 initiates a communication with a tenant endpoint (355, 360, 455, 460) in tenant A premise 350 or tenant B premise 450. In embodiments, the communication is the result of a computing function performed by a resource (for example server 210, server 305, or server 405) in service provider environment 100.

At step 610, processor 230 determines whether the communication from step 605 is from a shared resource, a tenant A dedicated resource, or a tenant B dedicated resource. For example, if the communication is from server 210 in shared resources 200, then processor 230 determines that the communication is from a shared resource and processing continues to step 615. If the communication is from server 210 (or some other resource in shared resources 200), and processor 230 determines that the communication is from a shared resource, then processing continues to step 620 to determine which tenant the endpoint belongs.

If, at step 610, processor 230 determines that the communication from step 605 is from a shared resource, then processing continues to step 620 where processor 230 determines the tenant to which the endpoint of the communication belongs. For example, endpoint 355 requests processing performed by server 210 and the communication is from processor 210 to endpoint 355 (which is an endpoint in tenant A premise 350). If at step 620, processor 230 determines that the communication is directed to an endpoint of tenant A, then processing continues to tenant A proxy 310 at step 625. Tenant A proxy 310 passes the communication onto VPN connection point 320.

At step 630, VPN connection point 320 performs the SNAT referenced above to translate the IP addresses used in tenant A dedicated environment 300 to a globally unique IP address that is used by only tenant A. For example, VPN connection point 320 SNATs the CGN IP address used by server 210 to a globally unique address used by endpoint 355.

At step 635, VPN 390 transmits the communication to tenant A premise 350. For example, the communication from server 210 (through proxy 310) is transmitted to tenant A premise 350. At step 640, tenant A premise 350 transmits the communication to the endpoint. For example, VPN connection point 365 in tenant A premise 350 transmits the communication from server 210 to endpoint 355.

If at step 620, processor 230 determines that the communication is directed to an endpoint of tenant B, then processing continues to tenant B proxy 410 at step 645. Tenant B proxy 410 passes the communication onto VPN connection point 420.

At step 650, VPN connection point 420 performs the SNAT referenced above to translate the IP addresses used in tenant B dedicated environment 400 to a globally unique IP address that is used by only tenant B. For example, VPN connection point 420 SNATs the CGN IP address used by server 210 to a globally unique address used by endpoint 455.

At step 655, VPN 490 transmits the communication to tenant B premise 450. For example, the communication from server 210 (through proxy 410) is transmitted to tenant B premise 450. At step 660, tenant B premise 450 transmits the communication to the endpoint. For example, VPN connection point 465 in tenant B premise 450 transmits the communication from server 210 to endpoint 455.

If, at step 610, processor 230 determines that the communication is from a dedicated resource, then processor 230 determines which tenant the dedicated resource belongs to. If at step 610, processor 230 determines that the communication is from a dedicated resource (such as, for example, server 305) in tenant A dedicated environment 300, then processing proceeds to step 665, where the communication is routed to tenant A dedicated environment 300. In embodiments, the CGN address of the dedicated resource is NATed to a globally unique address. Processing then continues to step 630 (described above).

If at step 610, processor 230 determines that the communication is from a dedicated resource (such as, for example, server 405) in tenant B dedicated environment 400, then processing proceeds to step 670, where the communication is routed to tenant B dedicated environment 400. In embodiments, the CGN address of the dedicated resource is NATed to a globally unique address. Processing then continues to step 650 (described above).

Figure 7:
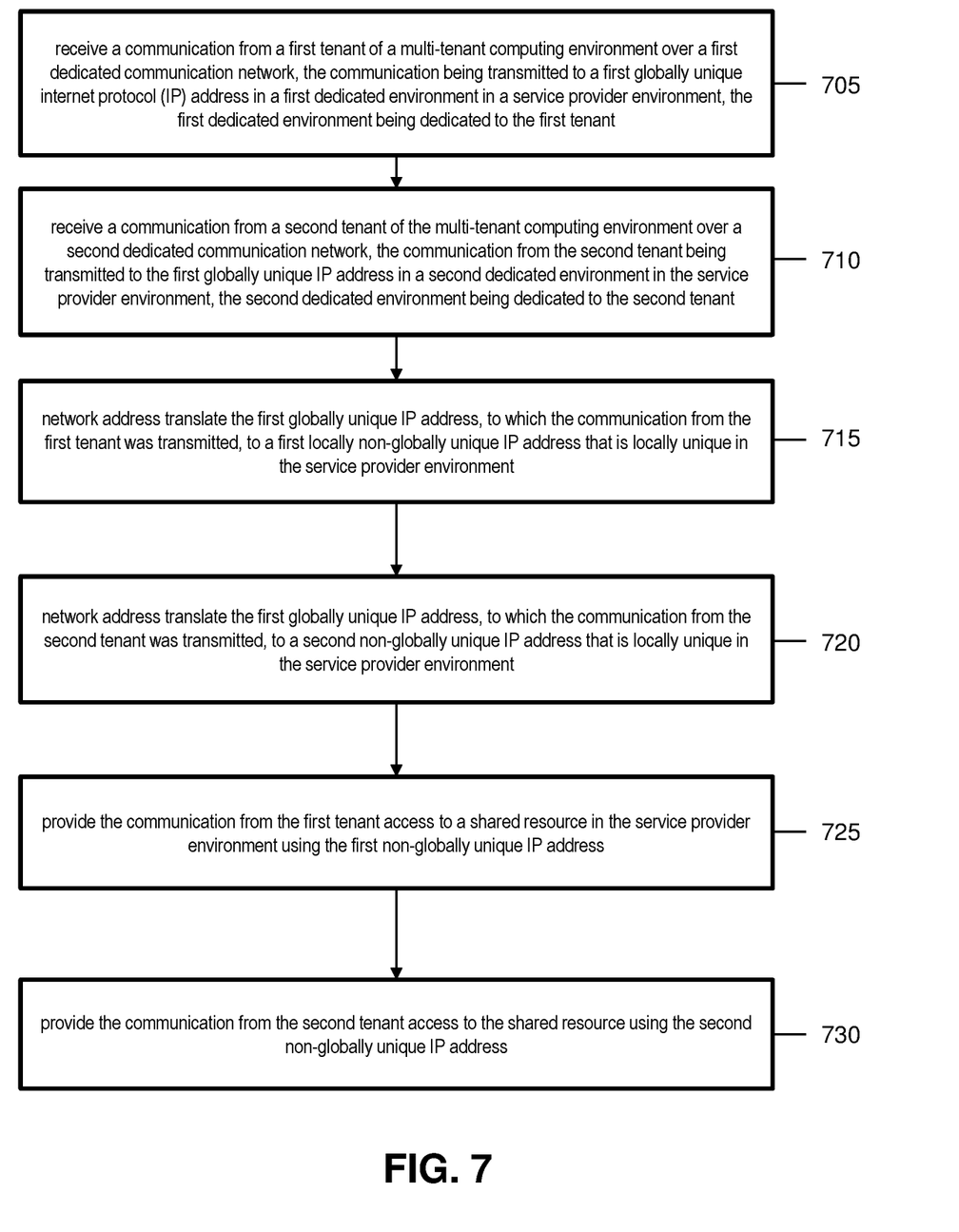
FIG. 7 shows a flowchart of an exemplary method in accordance with aspects of the invention.

FIG. 7 shows a flowchart of an exemplary method in accordance with aspects of the present invention. Steps of the method may be carried out in the environments of FIGS. 4 and 5 and are described with reference to elements depicted in FIGS. 4 and 5.

At step 705, the system receives a communication from a first tenant of a multi-tenant computing environment over a first dedicated communication network, the communication being transmitted to a first globally unique IP address in a first dedicated environment in a service provider environment, the first dedicated environment being dedicated to the first tenant. For example, computer device 100 receives a communication from tenant A premise 350 over VPN 390, the communication being transmitted to a first globally unique IP address in tenant A dedicated environment 300.

At step 710, the system receives a communication from a second tenant of the multi-tenant computing environment over a second dedicated communication network, the communication from the second tenant being transmitted to the first globally unique IP address in a second dedicated environment in the service provider environment, the second dedicated environment being dedicated to the second tenant. For example, computer device 100 receives a communication from tenant B premise 450 over VPN 490, the communication from tenant B premise 450 being transmitted to the first globally unique IP address in tenant B dedicated environment 400.

At step 715, the system network address translates the first globally unique IP address, to which the communication from the first tenant was transmitted, to a first locally non-globally unique IP address that is locally unique in the service provider environment. For example, proxy 310 network address translates the first globally unique IP address, to which the communication from tenant A premise 350 was transmitted, to a first locally non-globally unique IP address that is locally unique in the service provider environment of computer device 100.

At step 720, the system network address translates the first globally unique IP address, to which the communication from the second tenant was transmitted, to a second non-globally unique IP address that is locally unique in the service provider environment. For example, proxy 410 network address translates the first globally unique IP address, to which the communication from the tenant B premise 450 was transmitted, to a second non-globally unique IP address that is locally unique in the service provider environment of computer device 100.

At step 725, the system provides the communication from the first tenant access to a shared resource in the service provider environment using the first non-globally unique IP address. For example, computer device 100 provides the communication from tenant A premise 350 access to server 210 in shared resources 200 using the first non-globally unique IP address.

At step 730, the system provides the communication from the second tenant access to the shared resource using the second non-globally unique IP address. For example, computer device 100 provides the communication from the tenant B premise 450 access to server 210 in shared resources 200 using the second non-globally unique IP address.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/ or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, by a computer device, a communication from a first tenant of a multi-tenant computing environment over a first dedicated communication network, the communication being transmitted to a first globally unique internet protocol (IP) address in a first dedicated environment in a service provider environment, the first dedicated environment being dedicated to the first tenant;
   receiving, by the computer device, a communication from a second tenant of the multi-tenant computing environment over a second dedicated communication network, the communication from the second tenant being transmitted to the first globally unique IP address in a second dedicated environment in the service provider environment, the second dedicated environment being dedicated to the second tenant;
   network address translating, by the computer device, the first globally unique IP address, to which the communication from the first tenant was transmitted, to a first non-globally unique IP address that is locally unique in the service provider environment;
   network address translating, by the computer device, the first globally unique IP address, to which the communication from the second tenant was transmitted, to a second non-globally unique IP address that is locally unique in the service provider environment;
   providing, by the computer device, the communication from the first tenant access to a shared resource in the service provider environment using the first non-globally unique IP address; and
   providing, by the computer device, the communication from the second tenant access to the shared resource using the second non-globally unique IP address.

2. The computer-implemented method of claim 1, wherein
   the first dedicated communication network connects the first tenant to the first dedicated environment in the multi-tenant computing environment, and
   the second dedicated communication network connects the second tenant to the second dedicated environment in the multi-tenant computing environment.

3. The computer-implemented method of claim 2, wherein the network address translating of the first globally unique IP address, to which the communication from the first tenant was transmitted, is performed on a subnet that is public and is non-routable on the Internet, and
   the network address translating of the first globally unique IP address, to which the communication from the second tenant was transmitted, is performed on the subnet that is public and is non-routable on the Internet.

4. The computer-implemented method of claim 3, wherein the network address translations are source network address translations (SNATs).

5. The computer-implemented method of claim 3, further comprising:
   creating, by the computer device, a first segment of the subnet for use with the first dedicated environment; and
   creating, by the computer device, a second segment of the subnet for use with the second dedicated environment, wherein the first segment is isolated from the second segment.

6. The computer-implemented method of claim 2, further comprising determining, by the computer device, that a first communication from the shared resource is directed to the first tenant based on the communication from the first tenant being sent from the first non-globally unique IP address.

7. The computer-implemented method of claim 6, further comprising network address translating, by the computer device and in response to the first communication from the shared resource, the first non-globally unique IP address to the first globally unique IP address with a proxy resource that resides in the first dedicated environment.

8. The computer-implemented method of claim 7, further comprising determining, by the computer device, that a second communication from the shared resource is directed to the second tenant based on the communication from the second tenant being sent from the second non-globally unique IP address.

9. The computer-implemented method of claim 8, further comprising network address translating, by the computer device and in response to the second communication from the shared resource, the second non-globally unique IP address to the first globally unique IP address with a proxy resource that resides in the second dedicated environment.

10. The computer-implemented method of claim 1, wherein the second non-globally unique IP address is not visible to the first tenant.

11. The computer-implemented method of claim 1, wherein the computer device includes software provided as a service in a cloud computing environment.

12. The computer-implemented method of claim 1, wherein the first dedicated communication network is a first virtual private network (VPN),
   the second dedicated communication network is a second virtual private network (VPN), and
   the first VPN and the second VPN are different networks.

13. A computer program product, the computer program product comprising a computer readable storage medium having program instructions embodied therewith, the program instructions executable by a computing device to cause the computing device to:
- receive a communication from a first tenant of a multi-tenant computing environment over a first dedicated communication network, the communication being transmitted to a first globally unique internet protocol (IP) address in a first dedicated environment in a service provider environment, the first dedicated environment being dedicated to the first tenant;
- receive a communication from a second tenant of the multi-tenant computing environment over a second dedicated communication network, the communication from the second tenant being transmitted to the first globally unique IP address in a second dedicated environment in the service provider environment, the second dedicated environment being dedicated to the second tenant;
- network address translate the first globally unique IP address, to which the communication from the first tenant was transmitted, to a first non-globally unique IP address that is locally unique in the service provider environment;
- network address translate the first globally unique IP address, to which the communication from the second tenant was transmitted, to a second non-globally unique IP address that is locally unique in the service provider environment;
- provide the communication from the first tenant access to a shared resource in the service provider environment using the first non-globally unique IP address; and
- provide the communication from the second tenant access to the shared resource using the second non-globally unique IP address.

14. The computer program product of claim 13, wherein the first dedicated communication network connects the first tenant to the first dedicated environment, and the second dedicated communication network connects the second tenant to a second dedicated environment.

15. The computer program product of claim 14, wherein the network address translations are performed on a subnet that is public and is non-routable on the Internet.

16. A system comprising:
- a processor, a computer readable memory, and a computer readable storage medium;
- program instructions to receive a communication from a first tenant of a multi-tenant computing environment over a first dedicated communication network, the communication being transmitted to a first globally unique internet protocol (IP) address in a first dedicated environment in a service provider environment, the first dedicated environment being dedicated to the first tenant;
- program instructions to receive a communication from a second tenant of the multi-tenant computing environment over a second dedicated communication network, the communication from the second tenant being transmitted to the first globally unique IP address in a second dedicated environment in the service provider environment, the second dedicated environment being dedicated to the second tenant;
- program instructions to network address translate the first globally unique IP address, to which the communication from the first tenant was transmitted, to a first non-globally unique IP address that is locally unique in the service provider environment;
- program instructions to network address translate the first globally unique IP address, to which the communication from the second tenant was transmitted, to a second non-globally unique IP address that is locally unique in the service provider environment;
- program instructions to provide the communication from the first tenant access to a shared resource in the service provider environment using the first non-globally unique IP address; and
- program instructions to provide the communication from the second tenant access to the shared resource using the second non-globally unique IP address,
- wherein the program instructions are stored on the computer readable storage medium for execution by the processor via the computer readable memory.

17. The system of claim 16, wherein the first dedicated communication network connects the first tenant to the first dedicated environment, and
the second dedicated communication network connects the second tenant to the second dedicated environment.

18. The system of claim 16, further comprising program instructions to determine that a first communication from the shared resource is directed to the first tenant based on the communication from the first tenant being sent from the first non-globally unique IP address.

19. The system of claim 18, further comprising program instructions to network address translate, in response to the first communication from the shared resource, the first non-globally unique IP address to the first globally unique IP address with a proxy resource that resides in the first dedicated environment.

20. The system of claim 16, wherein the second non-globally unique IP address is not visible to the first tenant.

* * * * *